July 25, 1961 R. S. ZEBARTH 2,993,228
POULTRY NECK SEVERING MACHINE
Filed Oct. 13, 1958 2 Sheets-Sheet 1

INVENTOR.
Ralph S. Zebarth
BY
ATTORNEY.

July 25, 1961 R. S. ZEBARTH 2,993,228
POULTRY NECK SEVERING MACHINE
Filed Oct. 13, 1958 2 Sheets-Sheet 2
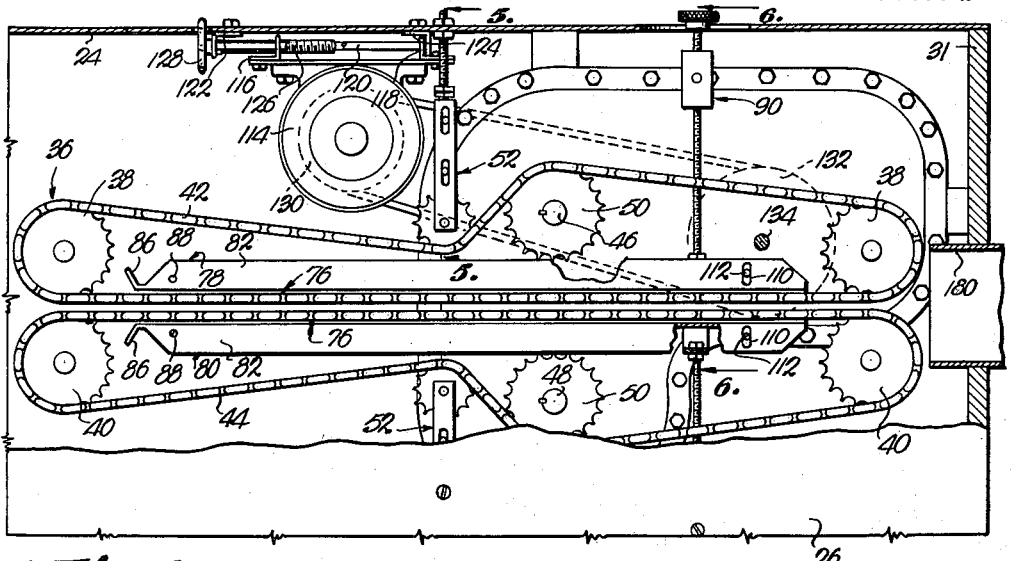
Fig. 3.
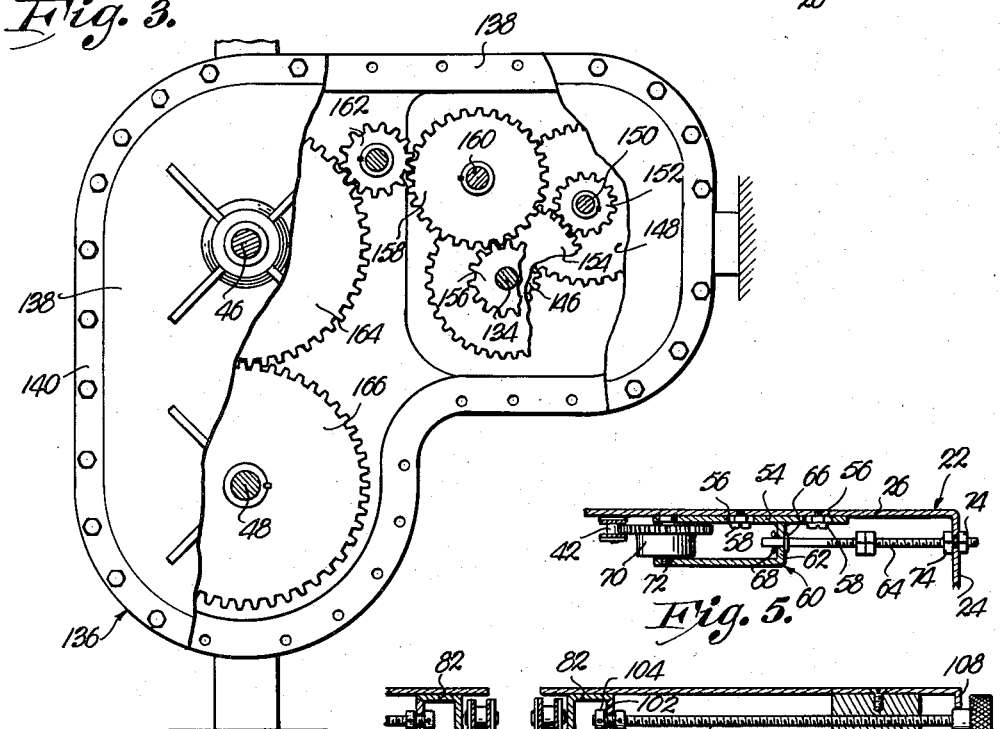
Fig. 4.
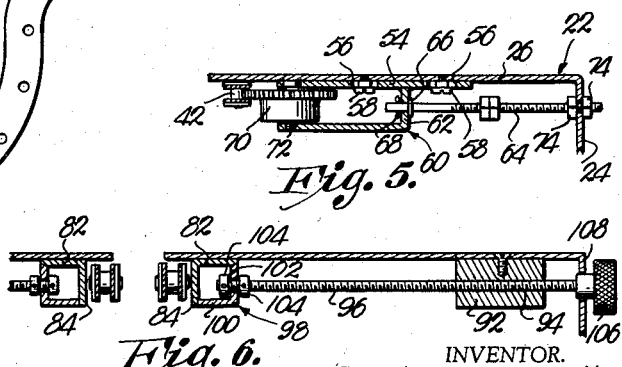
Fig. 5.
Fig. 6.
INVENTOR.
Ralph S. Zebarth
BY
ATTORNEY.

United States Patent Office 2,993,228
Patented July 25, 1961

2,993,228
POULTRY NECK SEVERING MACHINE
Ralph S. Zebarth, Hickman Mills, Mo., assignor, by mesne assignments, to Gordon Johnson Company, Kansas City, Mo., a corporation of Missouri
Filed Oct. 13, 1958, Ser. No. 766,859
17 Claims. (Cl. 17—12)

This invention relates to poultry processing equipment and particularly to a machine for automatically severing the neck of a bird from its body substantially at the zone of merger of the bird's neck with its spine.

It is the most important object of the instant invention to provide apparatus for automatically disjointing the neck of a bird from its body by permanently separating a pair of the bird's vertebrae at the zone of merger of the neck thereof with its body, followed by severing of the skin, flesh and muscles of the bird's neck between the permanently separated vertebrae, whereby a relatively sharp rotating cutter blade may be employed to effect the severing operation without dulling of the same during use, which would be occasioned if it was necessary for such blade to also cut through the vertebrae of the bird's neck.

It is a further important object of the invention to permit severing of the bird's neck at the zone of merger thereof with its body with a clean cut being effected because of the prior disjointing operation referred to above, and with maximum skin being retained on the severed neck and with no loss of the poultry being occasioned by virtue of removal of the bird's neck from its body.

It is another important object of the invention to provide an automatic neck severing machine of the character described which may be utilized to remove necks from poultry disposed on a moving conveyor line and hanging by their feet, whereby the operation is rendered more economical than prior procedures not only because of the speed at which the necks are severed from the birds' bodies, but also because conventional semi-automatic poultry processing lines employ conveyors from which the birds normally depend and it is therefore unnecessary to modify the processing line in any manner whatsoever.

Also an important object of the invention is to provide an automatic neck severing machine which may be employed to remove the necks from birds at a much faster rate than heretofore by virtue of the initial step of permanently separating a pair of the birds' vertebrae adjacent the zone of merger of the poultry's necks with their bodies, whereby an area of easy cutting is set up and which is devoid of bone that would impede the cutting action of the cutter blade and also quickly dull the same.

Other important objects of the invention relate to the provision of a conveyor assembly carried by the support of the machine adapted to engage the neck of the bird to move the same into the vertebrae separating and cutting components at a speed correlated with the advancement of the bird by the overhead conveyor unit, thereby assuring that the neck of the bird is severed along a transverse plane substantially perpendicular to the longitudinal length of the fowl's neck; to novel vertebrae separating mechanism utilizing a pair of oppositely rotating discs having means on the peripheral edges thereof for engaging and permanently separating a pair of the bird's vertebrae at the desired zone and without causing deleterious effects on the skin of the bird's neck which would detract from the appearance of the product and thereby lower the saleability of the same; to a machine of the character referred to wherein the various components thereof are adjustable to permit compensation for poultry of different sizes and also to assure proper advancement of the neck into engagement with the vertebrae separating and severing components; to a novel power driven gear box assembly for driving the vertebrae separating discs and the neck advancing conveyor assembly at constant speeds by virtue of being driven from a common power source and assuring proper movement of the poultry through the machine without jamming of the moving parts, which would necessitate shutting down the production line and also damage the birds caught in the present apparatus; to the provision of means on the neck severing apparatus for spraying liquid onto the birds during the time the same are passed through the machine to wash the birds and remove all foreign materials such as blood, feathers and similar substances; to chute means carried by the machine in a position to receive the severed necks and deliver the same to a point remote from the machine; and to other important objects and details of construction which will become obvious or be explained in detail as the following specification progresses.

In the drawings:
FIGURE 1 is a perspective view of a neck severing machine for poultry products and illustrating the way in which the same is adapted to be disposed to receive the neck of a bird as the same is advanced along a conventional overhead conveyor line;

FIG. 3 is an enlarged, fragmentary view of the machine shown in FIG. 1 with the main upper cover plates broken away to reveal the details of construction of the components within the main housing of the machine;

Figure 1:
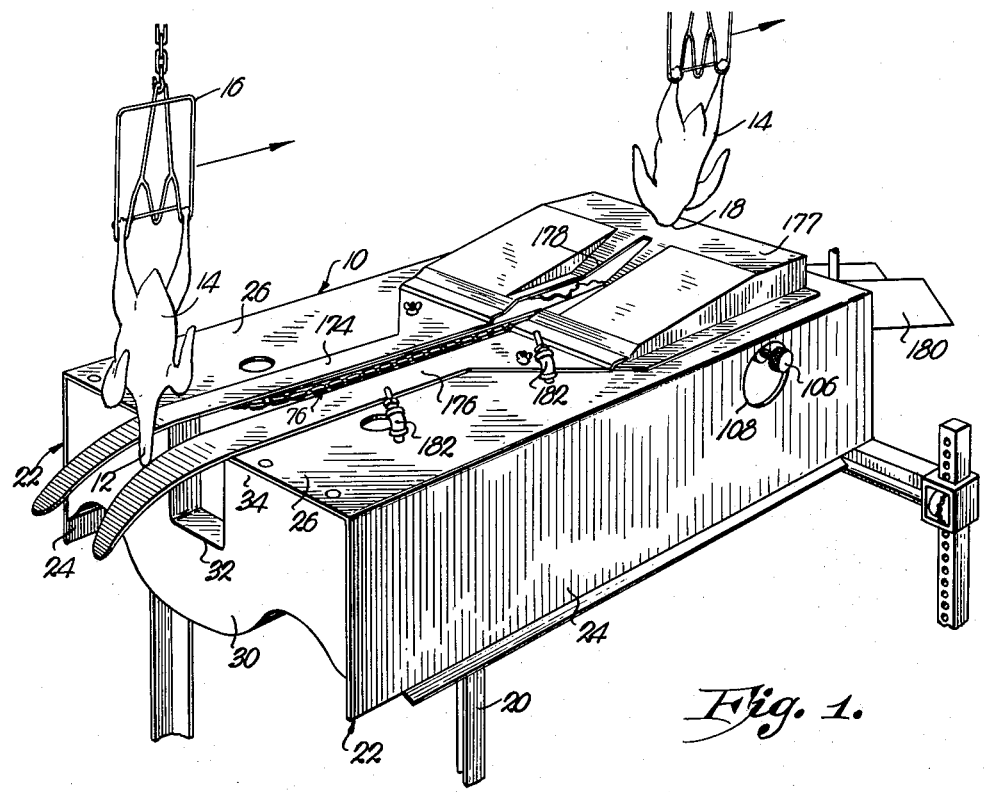

FIG. 4 is an enlarged, fragmentary, plan view of the gear box forming a part of the poultry neck severing machine and utilized to operably connect the prime mover with the neck advancing, vertebrae separating and neck severing components of the apparatus, certain portions of the gear box and gears thereof being broken away to reveal details of the elements thereunder; and FIGS. 5 and 6 are enlarged, fragmentary, vertical, cross-sectional views taken on the lines 5—5 and 6—6 respectively of FIG. 3.

A poultry neck severing machine is illustrated in the drawings and designated by the numeral 10, machine 10 being particularly adapted for automatically removing the neck 12 from birds 14 while the same depend by their legs from a shackle 16 in turn carried by a continuously moving overhead conveyor (not shown). Poultry neck severing machine 10 is constructed so as to sever the neck 12 of bird 14 substantially at the zone 18 of bird 14 defined by the area of merger of neck 12 with the uppermost part of the bird's body and which is substantially at the point at which the vertebrae in the bird's neck join its spine.

Frame 20 of machine 10 supports a pair of substantially L-shaped bed plates 22, with the vertical wall portions 24 of each bed plate 22 resting on frame 20 while upper horizontal cover portions 26 lie in a common plane and are disposed with their proximal, longitudinally extending edges 28 in spaced relationship. Vertical end walls 30 and 31 connected to opposed ends of bed plates 22 and interconnecting the same transversely thereof each have elongated, vertical, centrally disposed notches 32 extending downwardly from the upper margins 34 of respective end walls 30 and 31. Notches 32 and end walls 30 and 31 are aligned longitudinally of machine 10 for clearing the neck 12 of birds 14 as the same are advanced through machine 10.

Conveyor mechanism broadly designated 36 and housed within bed plates 22 and end walls 30 includes a pair of sprocket wheels 38 rotatably carried by suitable bracket means (not shown) beneath the cover portion 26 of one of the bed plates 22 and disposed in longitudinally spaced relationship, while a second pair of identical sprocket wheels 40 are likewise rotatably mounted by suitable bracket components (not shown) beneath the cover portion 26 of the opposite bed plate 22, corresponding sprocket wheels 38 and 40 being located in opposed, transverse alignment beneath cover portions 26, as clearly shown in FIG. 3. The axes of sprocket wheels 38 and 40 are also aligned longitudinally of bed plates 22 and parallel with the major length of respective edges 28. Furthermore, one pair of sprocket wheels 38 and 40 are located in close proximity to end wall 31 while the other pair of sprocket wheels 38 and 40 are disposed in somewhat greater spaced relationship to end wall 30. A pair of endless chains 42 and 44 of equal length are trained about respective pairs of sprocket wheels 38 and 40, with each chain 42 and 44 being of sufficient length that the same is relatively loose when initially placed around corresponding sprocket wheels 38 and 40. Vertical shafts 46 and 48 located on opposite sides of edges 28 of bed plates 22 and disposed between respective sprocket wheels 38 and 40, each have a sprocket wheel 50 keyed thereto and disposed to engage chain 42 or 44 respectively. Shafts 46 and 48 are located in predetermined positions relative to edges 28 of bed plates 22 and also with respect to end wall 31, for reasons to be hereinafter defined.

Means for maintaining each of the endless chains 42 and 44 in a substantially taut condition comprises a pair of idler assemblies 52 identical in character and mounted beneath cover portions 26 of each of the bed plates 22 in transversely extending relationship thereto. Each idler assembly 52 includes an elongated member 54 having a pair of longitudinally extending, spaced slots 56 adapted to receive respective screws 58 threaded into corresponding cover portions 26, as clearly indicated in FIG. 5. A substantially L-shaped bracket 60 having a vertical leg 62 secured to the lower face of member 54 intermediate the ends thereof receives one end of an adjusting screw 64, with washer 66 secured to screw 64 limiting movement of the latter in one direction toward leg 62 of bracket 60, while removable cotter pin 68 restricts shifting movement of externally threaded screw 64 in the opposite direction. Idler sprocket wheel 70, rotatably mounted between elongated leg 62 of bracket 60 and member 54 by a shaft 72 extending therebetween, is adapted to engage a respective chain 42 or 44 in order to maintain the same in a taut condition. Lock nuts 74 movably threaded on screw 64 on opposed sides of a corresponding vertical wall 24 permit selective adjustment of a respective idler sprocket wheel 70 with respect to each of the chains 42 and 44. Screws 58 may be readily loosened to permit the adjustment referred to above.

With idler sprocket wheels 70 in relatively firm engagement with chains 42 and 44, elongated stretches 76 of chains 42 and 44 are disposed in proximal, substantially parallel relationship and it is to be noted at this point that sprocket wheels 38 and 40 are so disposed as to cause stretches 76 of each of the chains 42 and 44 to be spaced a distance somewhat less than the normal diameter of the neck 12 of a bird 14. In this manner, when the neck 12 of a bird 14 is received between stretches 76 of chains 42 and 44, such neck is advanced during rotation of sprocket wheels 50 and thereby movement of chains 42 and 44, as hereinafter more fully explained.

Elongated guides 78 and 80 are mounted beneath cover portions 26 of bed plates 22 adjacent edges 28 thereof. Each of the guides 78 and 80 is transversely L-shaped and has a longitudinally extending leg 82 flush with cover portions 26, as well as a longitudinally extending leg 84 integral with a respective leg 82, depending therefrom and engaging a respective stretch 76 of chains 42 and 44. Outwardly turned extensions 86 integral with legs 84 of guides 78 and 80 and located adjacent end wall 30 serve to assure movement of necks 12 of birds 14 into the space between stretches 76 of chains 42 and 44.

The ends of guides 78 and 80 having extensions 86 thereon are pivotally secured to respective cover portions 24 of bed plates 22 by pins 88, while adjustable mechanism broadly numerated 90 is secured to opposite ends of each of the guides 78 and 80 for pivoting corresponding ends of guides 78 and 80 about pivot pins 88. Each of the adjustment mechanisms 90 is substantially identical in construction and comprises a block 92 secured to the underface of a corresponding cover portion 26 and having a longitudinally extending, horizontal, internally threaded passage 94 complementally receiving an elongated, externally threaded adjustment screw 96. L-shaped brackets 98 mounted in positions with the legs 100 thereof secured to a respective leg 84 of corresponding guides 78 and 80 and a leg 102 joined to respective legs 82 of guides 78 and 80, are located in positions whereby legs 102 of brackets 98 may receive the innermost ends of screws 96. Releasable lock collars 104 secured to screws 96 on opposed sides of respective legs 102 prevent movement of screws 96 relative to brackets 98. Knurled knobs 106 secured to the outermost ends of screws 96 projecting through openings 108 in corresponding vertical side wall portions 24 facilitate rotation of screws 96 to swing the ends of guides 78 and 80 adjacent wall 31 about pivot pins 88. Transversely extending slots 110 in each of the guides 78 and 80 adjacent adjustment mechanisms 90 and slidably receiving depending pins 112 carried by cover portions 26 restrict swinging of guides 78 and 80 toward and away from stretches 76 of chains 42 and 44.

Power means for rotating shafts 46 and 48 and thereby sprocket wheels 50 operably coupled with chains 42 and 44, includes an electric motor 114 adjustably mounted on wall 24 of one of the bed plates 22. As shown in FIG. 3, a pair of parallel, elongated, L-shaped brackets 116 and 118 are secured to the base of motor 114 and are horizontally reciprocable on a pair of parallel, spaced rods 120, in turn mounted on a pair of upright, L-shaped brackets 122 and 124 secured to the defined side wall 24 of machine 10. An externally threaded screw 126 passing through brackets 122 and 116 in parallelism with rods 120 permits horizontal adjustment of motor 114 in response to turning of hand wheel 128 secured to the outer end of screw 126.

Pulley 130 on the shaft of motor 114 is operably coupled with the pulley 132 mounted on shaft 134 of a gear unit broadly numerated 136. Opposed, cup-shaped housings 138 have releasably interconnected, complemental flanges 140 which prevent leakage of oil contained within gear unit 136 with shafts 46 and 48 constituting a part of gear unit 136 and extending upwardly therefrom above cover portions 26 of bed plates 22 to receive respective vertebrae separating discs 142 and 144, to be described in greater detail hereinafter. A relatively small spur gear 146 keyed to shaft 134 intermeshes with a substantially larger spur gear 148, in turn keyed to a shaft 150 parallel with shaft 134. Another small spur gear 152 keyed to shaft 150 above spur gear 148 intermeshes with a relatively larger spur gear 154 freely rotatable on shaft 134 but having a small spur gear 156 disposed thereabove in surrounding relationship to shaft 134 and rigidly connected to gear 154 for rotation therewith. Large spur gear 158 keyed to shaft 160 parallel with shafts 134 and 150 operably intermeshes with spur gear 156, as well as a relatively small spur gear 162 interposed between spur gear 158 and another large spur gear 164 keyed to shaft 46. A spur gear 166 of a diameter equal to gear 164 intermeshes with the latter and is keyed to shaft 48. It is therefore apparent that shaft 134, which also extends upwardly from the uppermost housing 138 of gear unit 136 is rotated at a substantially higher rate than shafts 46 and 48 during operation of motor 114.

Figure 2:
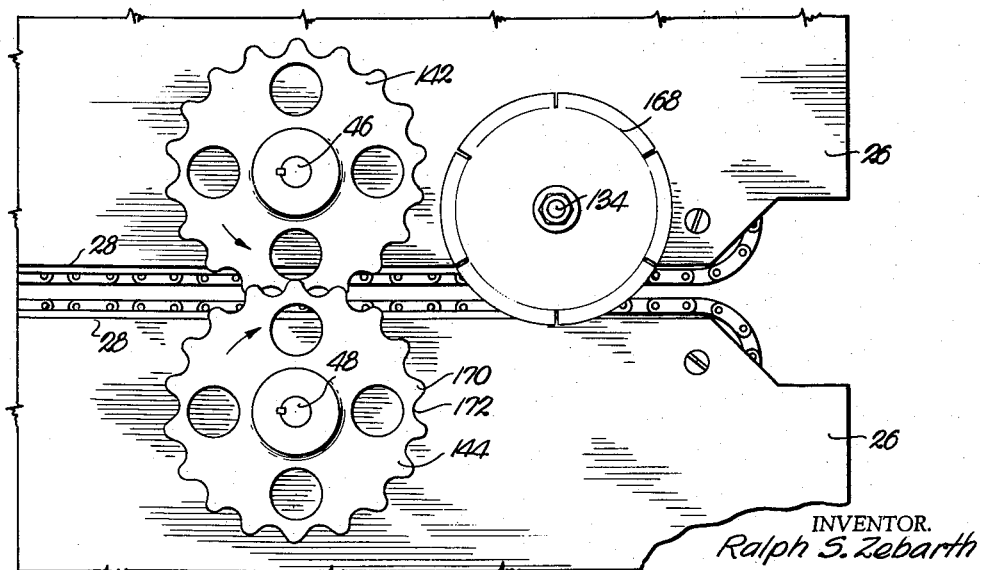
FIG. 2 is an enlarged, fragmentary, plan view of the vertebrae separating and neck severing components of the instant machine, with the cover plate normally overlying the same removed to expose the parts thereunder.

Shafts 134, 46 and 47 extend upwardly through cover portions 26 of respective bed plates 22 with shaft 134 being located to one side of stretches 76 of chains 42 and 44, as shown in FIG. 2. A disc-like cutter 168 is secured to the upper end of shaft 134 above cover portions 26 and clears the outer peripheral margins of discs 142 and 144.

Each of the discs 142 and 144 has an undulating peripheral margin formed of a series of circumferentially spaced, outwardly extending projections 170 provided with smooth convex edges, integral with respective discs 142 and 144 and interconnected by concave edges 172 presenting notches between projections 170 and merging smoothly with the latter.

Discs 142 and 144 are of predetermined diameter so as to cause projections 170 to overlap during rotation of discs 142 and 144, while edges 172 on opposed discs are in spaced relationship to receive the skin, flesh and muscles of the bird's neck during advancement of the same by stretches 76 of conveyors 42 and 44.

A pair of guide plates 174 and 176 disposed on opposed sides of stretches 76 of chains 42 and 44 above cover portions 26 are adapted for assuring movement of the neck 12 of bird 14 into the space between stretches 76 as the bird is advanced forwardly by the overhead conveyor mechanism referred to above. A protective cover panel 177 overlying discs 142 and 144 and cutter 168 prevents the operator from being injured by the rotating mechanism, while an elongated slot 178 in cover panel 177 and aligned with stretches 76 clears the neck 12 of bird 14 until the neck is severed by cutter blade 168. An elongated, substantially U-shaped chute 180 disposed within the notch 32 of end wall 31 receives necks 12 of birds 14 after severing of the same and conveys such necks to a desired point remote from machine 10.

In operation, motor 114 is operated to rotate pulley 132 which in turn causes gear 146 keyed to shaft 134 to turn gear 148, thereby effecting rotation of shaft 150 and spur gear 152 connected thereto. Gear 154 is rotated responsive to movement of gear 152 and turns spur gear 156 therewith which causes gears 164 and 166 and thereby shafts 46 and 48 to be rotated through gears 158 and 162. Shaft 134, having cutter blade 168 connected thereto, is rotated at a substantially higher speed than shafts 46 and 48, while discs 142 and 144 are rotated at a speed correlated with advancement of chains 42 and 44 by virtue of the fact that sprocket wheels 50 are mounted on shafts 46 and 48 in conjunction with discs 142 and 144 and are of substantially equal diameter.

As the birds are advanced by the overhead conveyor mechanism in a position depending from shackles 16, the necks 12 thereof are directed into the space between stretches 76 of chains 42 and 44 by guide plates 174 and 176 and also extensions 86 on guides 78 and 80. It is to be understood that the chains 42 and 44 are driven at a speed substantially equal to that of the overhead conveyor mechanism so that bird 14 is maintained in an upright position as the same is moved toward discs 142 and 144. When the neck 12 of bird 14 reaches discs 142 and 144, the proximal projections 170 are forced into the bird's neck between a pair of vertebrae substantially at the zone of merger of the fowl's neck with its spine. Although discs 142 and 144 are not positioned so that the same are in interengagement, such discs are in relatively close proximity so that projections 170 permanently separate a pair of vertebrae while the skin, flesh and muscles of the bird's neck are received in the space between opposed edges 172 presenting notches between projections 170. Discs 142 and 144 operate to separate the bird's vertebrae at the desired point without injuring the external surface of such neck, which would mar the appearance of the final dressed product, and furthermore, separation of a pair of vertebrae is effected in close proximity to the main body of the bird 14.

As the neck 12 of bird 14 is continuously moved forward by chains 42 and 44, such neck is severed between the permanently separated vertebrae by cutter disc 168 which lies substantially in a horizontal plane through the space between overlapping portions of discs 142 and 144. Thus, a clean cut is obtained inasmuch as it is not necessary for the blade to sever bone during the cutting operation and the neck presents a neat appearance, since blade 168 does not become dulled rapidly which would otherwise be the case if it was necessary that such blade also cut through the bone of the bird's neck.

It should also be pointed out that water spray mechanism may be provided on machine 10 for spraying water from nozzles 182 onto bird 14 and the neck 12 thereof during the vertebrae separating and neck severing procedure related above.

Machine 10 is also advantageous since full adjustment of the various components is provided to compensate for birds having necks of different sizes and also assuring proper forward movement of the neck 12 of bird 14 in conjunction with forward advancement of the same by the overhead conveyor system.

The speed at which the neck removal process may be carried out is greatly increased through utilization of machine 10 because of the fact that it is necessary for cutter 168 to only sever an area of the bird's neck devoid of bone and therefore, the cutting is rendered much easier and faster and birds may be passed through the machine at a relatively high rate of speed.

Having thus described the invention what is claimed as new and desired to be secured by Letters Patent is:

1. In poultry processing equipment for severing the neck of a bird from its body adjacent the zone of juncture of the neck of the bird with its spine and as the bird is advanced along a predetermined path of travel, the combination of: a support adapted to be disposed adjacent said path of travel of the bird; a pair of elements rotatably mounted on the support on opposed sides of said path of travel of the bird, in vertically partially overlapping relationship, disposed to receive the neck of the bird therebetween substantially at said zone and having peripheral portions cooperable during rotation of the elements and advancement of the bird to permanently separate a pair of the bird's vertebrae substantially at said zone; and cutter means carried by the support in a position to sever the skin, flesh and muscles of the bird's neck between said permanently separated vertebrae thereof as the bird is advanced.

2. In poultry processing equipment for severing the neck of a bird from its body adjacent the zone of juncture of the neck of the bird with its spine and as the bird is advanced along a predetermined path of travel, the combination of: a support adapted to be disposed adjacent said path of travel of the bird; conveyor means on the support and adapted to engage and move the neck of the bird along the support parallel with said path and at a speed correlated with the rate of advancement of the bird; structure rotatably caried by the support on opposed sides of said path of travel of the bird, in vertically partially overlapping relationship, disposed to receive the neck of the bird therebetween substantially at said zone and cooperable to permanently separate a pair of the bird's veretbrae located substantially at said zone; and cutter means carried by the support in a position to sever the skin, flesh and muscles of the bird's neck between said permanently separated vertebrae thereof as the bird is advanced.

3. Poultry processing equipment as set forth in claim 2 wherein said structure and the cutter means are rotatable about parallel axes and lie in a substantially common plane spaced from said conveyor means.

4. In poultry processing equipment for severing the neck of a bird from its body adjacent the zone of juncture of the neck of the bird with its spine and as the bird is advanced along a predetermined path of travel, the combination of: a support adapted to be disposed adjacent said path of travel of the bird; conveyor means on the support and adapted to engage and move the neck of the bird along the support parallel with said path and at a speed correlated with the rate of advancement of the bird; structure rotatably carried by the support on opposed sides of said path of travel of the bird, in vertically partially overlapping relationship, disposed to receive the neck of the bird therebetween substantially at said zone and cooperable to permanently separate a pair of the bird's vertebrae located substantially at said zone; cutter means carried by the support in a position to sever the skin, flesh and muscles of the bird's neck between said permanently separated vertebrae thereof as the bird is advanced; and chute means connected to said support and disposed to receive and convey the bird's neck after severing of the same, to a point remote from the support.

5. In poultry processing equipment for severing the neck of a bird from its body adjacent the zone of juncture of the neck of the bird with its spine and as the bird is advanced along a predetermined horizontal path of travel, the combination of: a horizontal suport adapted to be disposed adjacent said path of travel of the bird; a pair of discs rotatably mounted on the support in vertically partially overlapping relationship, on opposed sides of said path of travel for rotation on parallel, substantially vertical axes and disposed to receive the neck of the bird therebetween substantially at said zone, said discs having irregularly configured peripheral margins, certain portions of said margins being in overlapping relationship during rotation of the discs and other portions of the margins being cooperable during advancement of the bird and rotation of the discs in opposite directions to move between and permanently separate a pair of the bird's vertebrae substantially at said zone; and cutter means rotatably carried by the support in spaced relationship to said discs, lying substantially in a common plane with the same and disposed to sever the skin, flesh and muscles of the bird's neck between said permanently separated vertebrae thereof and as the bird is advanced.

6. Poultry processing equipment as set forth in claim 5 wherein the distance between said other portions of the discs is substantially equal to the diameter of said skin, flesh and muscles of the bird's neck when the same are in a transversely compressed condition.

7. Poultry processing equipment as set forth in claim 5 wherein said irregular peripheral margin of each of the discs is defined by a series of circumferentially spaced, outwardly extending projections integral with a respective disc and each having a smooth, arcuate extremity, said projections being interconnected by concave edges presenting notches between the projections and merging smoothly with the latter.

8. Poultry processing equipment as set forth in claim 7 wherein the projections on one of the discs overlap corresponding opposed projections on the opposite disc during rotation of the same, the concave edges of said one disc being in slightly spaced relationship to corresponding opposed concave edges during said rotation of the disc.

9. Poultry processing equipment as set forth in claim 8 wherein is provided power means operably coupled with said discs for rotating the same in opposite directions at a constant speed.

10. In poultry processing equipment for severing the neck of a bird from its body adjacent the zone of juncture of the neck of the bird with its spine and as the bird is advanced along a predetermined horizontal path of travel, the combination of: a support adapted to be disposed adjacent said path of travel of the bird; an assembly on the support including a pair of conveyor units having spaced means adapted to engage and move the neck of the bird along the support on a horizontal line parallel with said path and at a speed correlated with the rate of advancement of the bird; a pair of elements rotatably mounted on the support on opposed sides of said path of travel of the bird, in vertically partially overlapping relationship and disposed to receive the neck of the bird therebetween substantially at said zone; power means operably coupled with said elements for rotating the same in opposite directions at a rate correlated with the speed of advancement of the neck by said conveyor assembly, said elements being cooperable during rotation thereof and upon engagement of the same with the bird's neck to permanently separate a pair of the bird's vertebrae at said zone; and cutter means rotatably carried by the support in a position to sever the skin, flesh and muscles of the bird's neck between said permanently separated vertebrae thereof as the bird is advanced.

11. Poultry processing equipment as set forth in claim 10 wherein said cutter means includes a circular, peripherally sharpened cutting blade overlying the area between said means of the conveyor units and rotatable about an axis parallel with and spaced from the axes of rotation of said elements.

12. Poultry processing equipment as set forth in claim 11 wherein said means of each of the conveyor units includes an endless chain, elongated portions of the chains being in proximal, substantially parallel relationship and spaced a distance less than the diameter of said neck of the bird whereby the neck is advanced along the support when the same is between said portions of the chains and as the latter are caused to move in opposite directions.

13. Poultry processing equipment as set forth in claim 12 wherein is provided elongated guide means on opposite sides of opposed portions of the chains for maintaining said opposed portions of the chains in substantially parallel relationship during disposition of the bird's neck therebetween.

14. Poultry processing equipment as set forth in claim 13 wherein said chains are movably mounted on idler sprockets rotatably carried by the support and idler means adjustably mounted on the support and operably engaging respective chains for varying the tension of the same.

15. Poultry processing equipment as set forth in claim 13 wherein is provided adjustable means on the support and connected to each of the guide means for changing the distance between the same along a substantial part of the length thereof.

16. Poultry processing equipment as set forth in claim 15 wherein the ends of said guide means adjacent said elements are movable toward and away from each other to vary the distance between corresponding lengths of said portions of the chains.

17. Poultry processing equipment as set forth in claim 12 wherein is provided spaced members disposed on the support in positions to guide the neck of the bird into the space between said portions of the chains.

References Cited in the file of this patent

UNITED STATES PATENTS

| | | |
|---|---|---|
| 2,236,075 | Siemann | Mar. 25, 1941 |
| 2,306,773 | Biffinger | Dec. 29, 1942 |
| 2,625,781 | Tateyama | Jan. 20, 1953 |
| 2,828,506 | O'Donnell | Apr. 1, 1958 |
| 2,846,718 | Sengelaub et al. | Aug. 12, 1958 |